Feb. 14, 1950 M. U. GILBREATH 2,497,352
POLE TRANSPORTING DOLLY
Filed Nov. 8, 1948
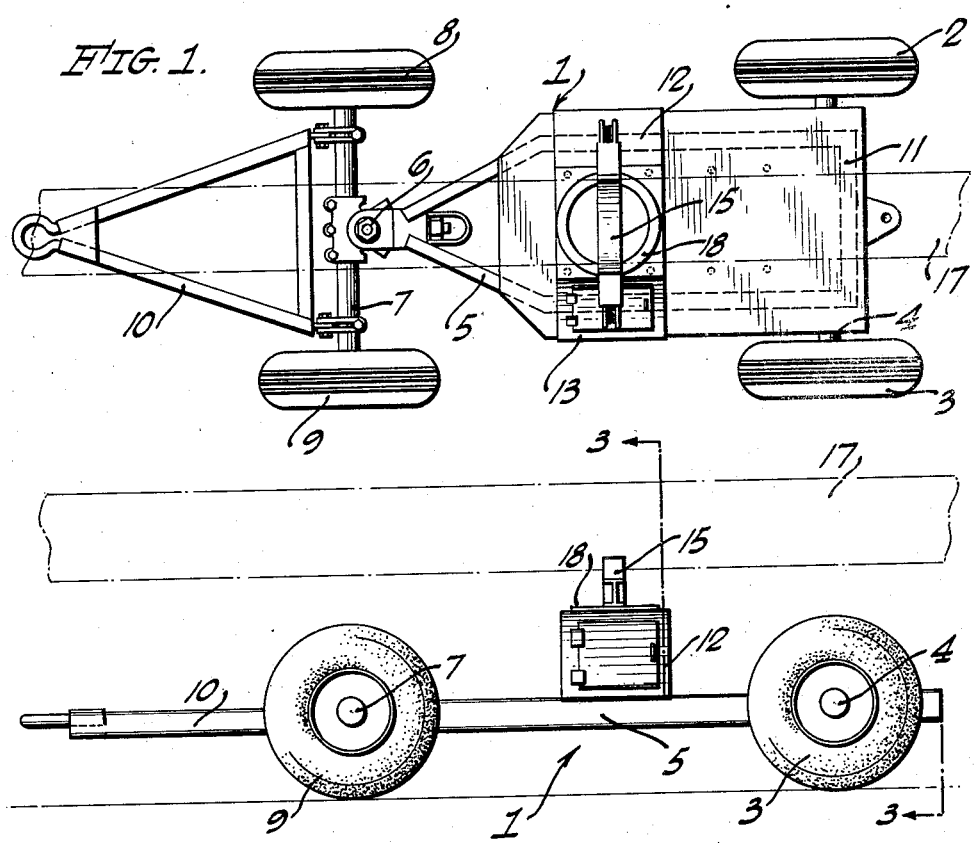
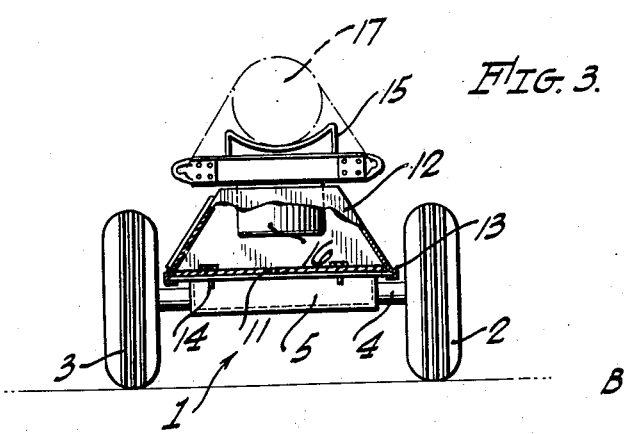
INVENTOR.
MARLIN U. GILBREATH,
BY
ATTORNEY.

Patented Feb. 14, 1950

2,497,352

UNITED STATES PATENT OFFICE 2,497,352

POLE TRANSPORTING DOLLY

Marlin U. Gilbreath, Long Beach, Calif.

Application November 8, 1948, Serial No. 58,888

2 Claims. (Cl. 280—143)

This invention relates to a pole transporting dolly whereby long wooden or metal poles, such as are used to support electric or telephone wires, are transported.

An object of my invention is to provide a novel dolly for transporting long poles, which will enable workmen to move a long pole into position to be erected, this positioning of the pole being accomplished from the dolly on which the pole is transported.

Another object of my invention is to provide a novel pole transporting dolly, which is simple in construction, effective in operation, and which will enable the workmen to move a pole through confined spaces.

A feature of my invention resides in the swivelly mounted saddle, so that the pole may be turned at any angle relative to the dolly.

Other objects, advantages and features of invention may appear from the accompanying drawing, the subjoined detailed description and the appended claims.

In the drawing—

Figure 1 is a top plan view of my pole transporting dolly.

Figure 2 is a side elevation of my pole transporting dolly.

Figure 3 is a view taken in the direction of the line 3—3 in Figure 2, and with parts broken away to show interior construction.

Referring more particularly to the drawing, the numeral 1 indicates my pole dolly, which includes a pair of rear wheels 2—3, which are mounted on a transverse axle 4. A frame 5 is fixedly secured on one end of the axle 4, and a king pin 6 is provided at the front end of the frame for the purpose of attaching the front steerable axle 7 to the frame. Front wheels 8—9 are journaled on the axle 7. A tongue 10 is pivotedly secured to the axle 7 and the dolly is pulled through the tongue which is secured to the towing vehicle. A flat bed or platform 11 is mounted on the frame 5 and is either welded or bolted to this frame. The sides of the platform protrude beyond the side members of the frame 5 and the purpose of this construction will be further described.

A bolster 12 is mounted transversally of the frame 5 and rests on the platform 11. The bolster is slidable longitudinally of the platform and for this purpose is guided by the flanged edges 13 of the bolster, which grip the sides of the platform, as shown in Figure 3. Pins 14 extend through the floor of the bolster and into the platform, thus holding the bolster in position. By removing these pins the bolster may be slid lengthwise of the platform and removed from the dolly, thus leaving the top of the platform clear so that large objects, such as an electric transformer, may be moved on the dolly, if desired.

A saddle 15 is mounted on a trunnion 16. The trunnion is journaled in the bolster 12 and permits the saddle to rotate through 360 degrees. The long pole 17 is secured to the saddle 15 and is fastened by means of a chain or cable or similar device. A circular track 18 is mounted on top of the bolster 12 and the saddle 15 moves on this track, permitting free rotation of the saddle when it is necessary to swing the pole at an angle to the longitudinal axis of the dolly.

In use, the pole 17 is secured to the saddle 15, after which the dolly is towed to the place where the pole is to be erected. Due to the pivotable mounting of the front axle 7 and further that the pole can be rotated through 360 degrees on the dolly, it is possible to maneuver the dolly close to the hole in which the pole is to set and then swing the base of the pole so that it can be easily guided into the hole at the same time that the pole is erected.

Having described my invention, I claim:

1. A pole transporting dolly comprising a flat platform, a pair of rear wheels mounted on the platform, a pair of front wheels pivotally mounted on the platform, and bolster resting on the platform, flanges on the bolster extending over the edge of the platform, whereby the bolster is slidably mounted on said platform, a saddle and a trunnion on the saddle journaled in said bolster.

2. A pole transporting dolly comprising a flat platform, a pair of rear wheels mounted on the platform, a pair of front wheels pivotally mounted on the platform, a bolster resting on the platform, flanges on each side of the bolster extending over the edge of the platform whereby the bolster is slidably mounted on said platform, a pin extending through the wall of the bolster and into the platform to limit sliding movement of said bolster, a saddle and a trunnion depending from the saddle, said trunnion being journalled in the bolster.

MARLIN U. GILBREATH.

REFERENCES CITED

The following references are of record in the file of this patent:

UNITED STATES PATENTS

| Number | Name | Date |
|---|---|---|
| 1,439,880 | Feigelson | Dec. 26, 1922 |
| 2,094,836 | Clark | Oct. 5, 1937 |